June 19, 1928.  1,673,993
H. PARKER
METHOD OF AND MACHINE FOR SQUEEZING TUBE ENDS
Filed June 11, 1926  4 Sheets-Sheet 4
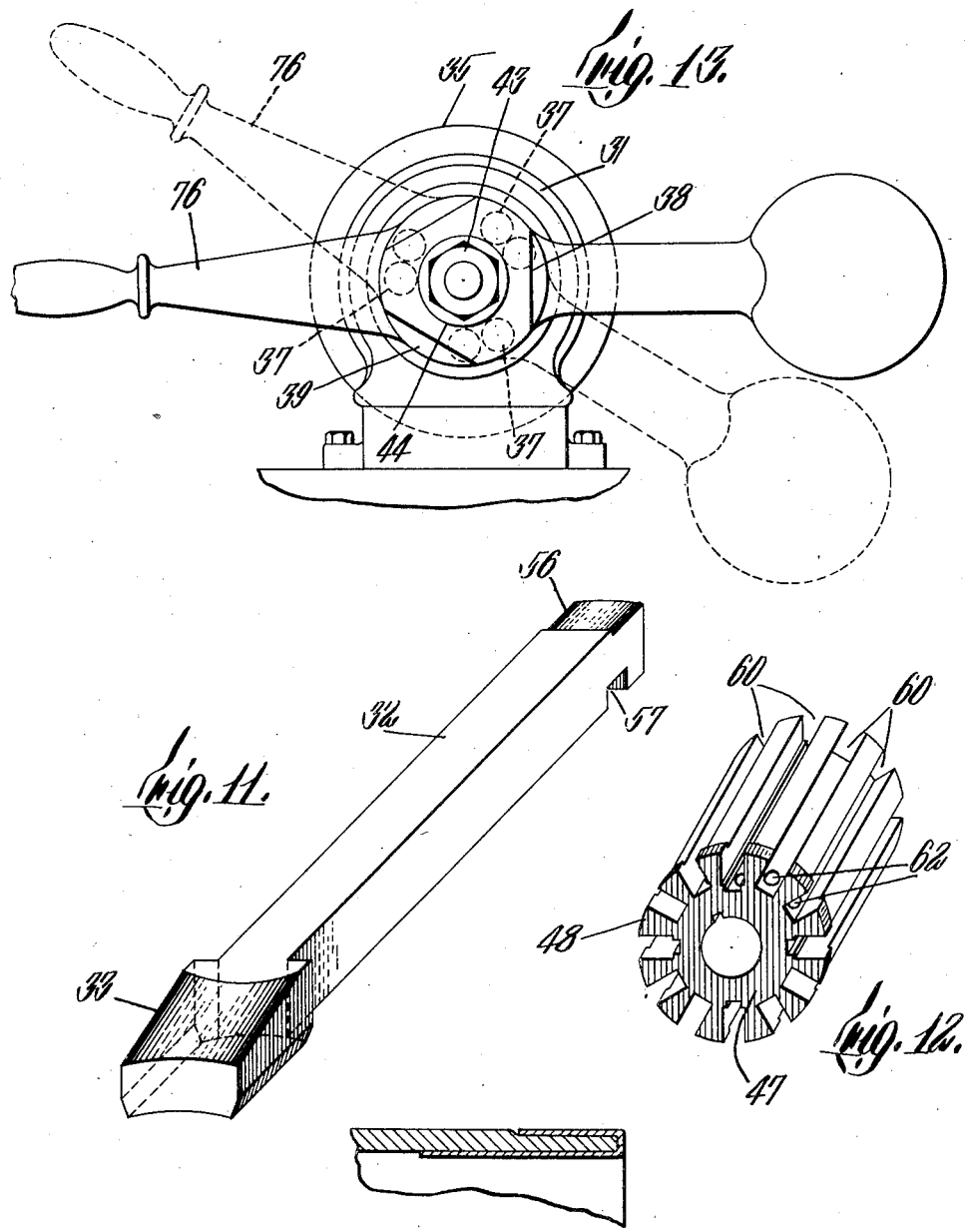
Inventor
Howard Parker Patented June 19, 1928.

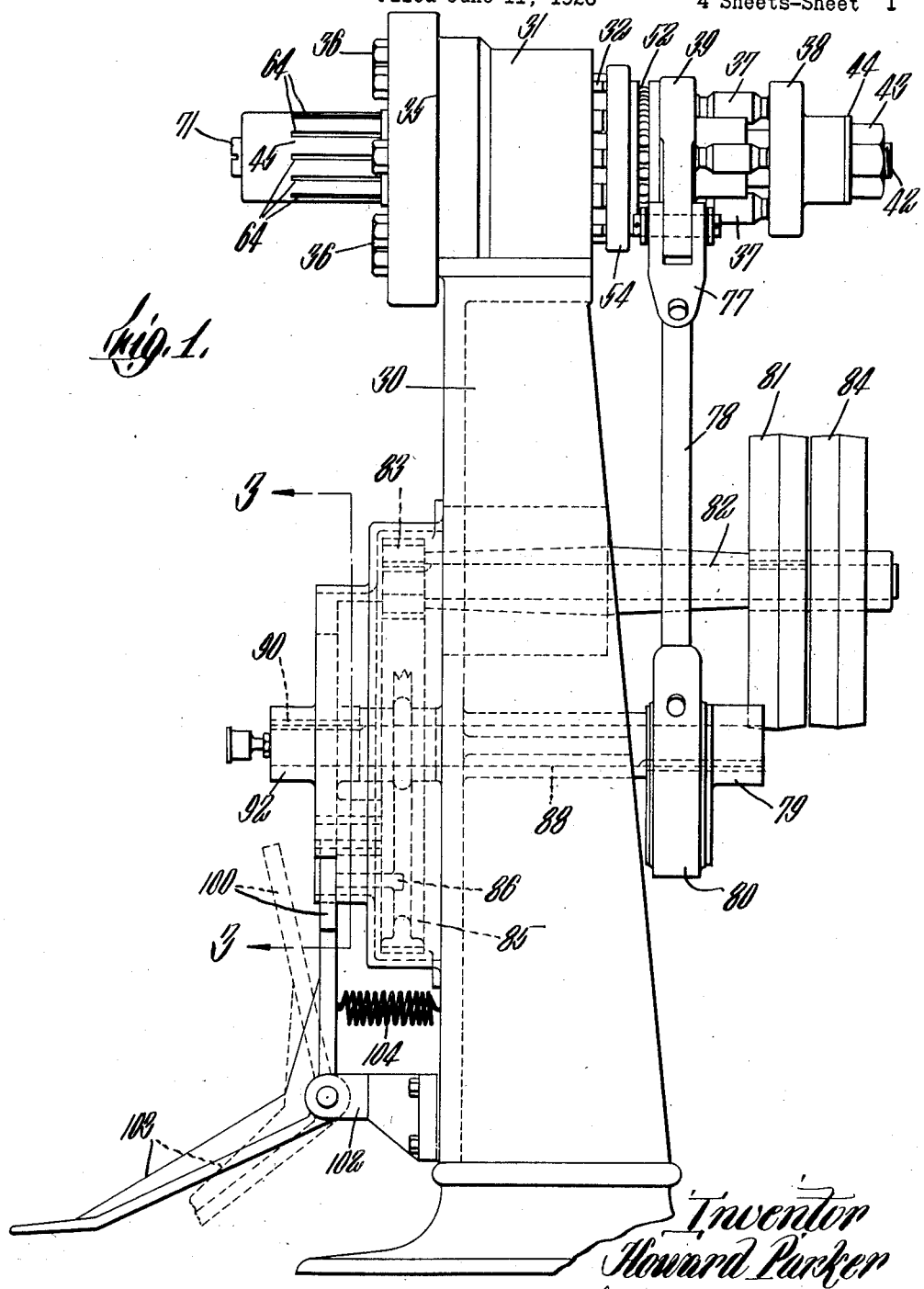

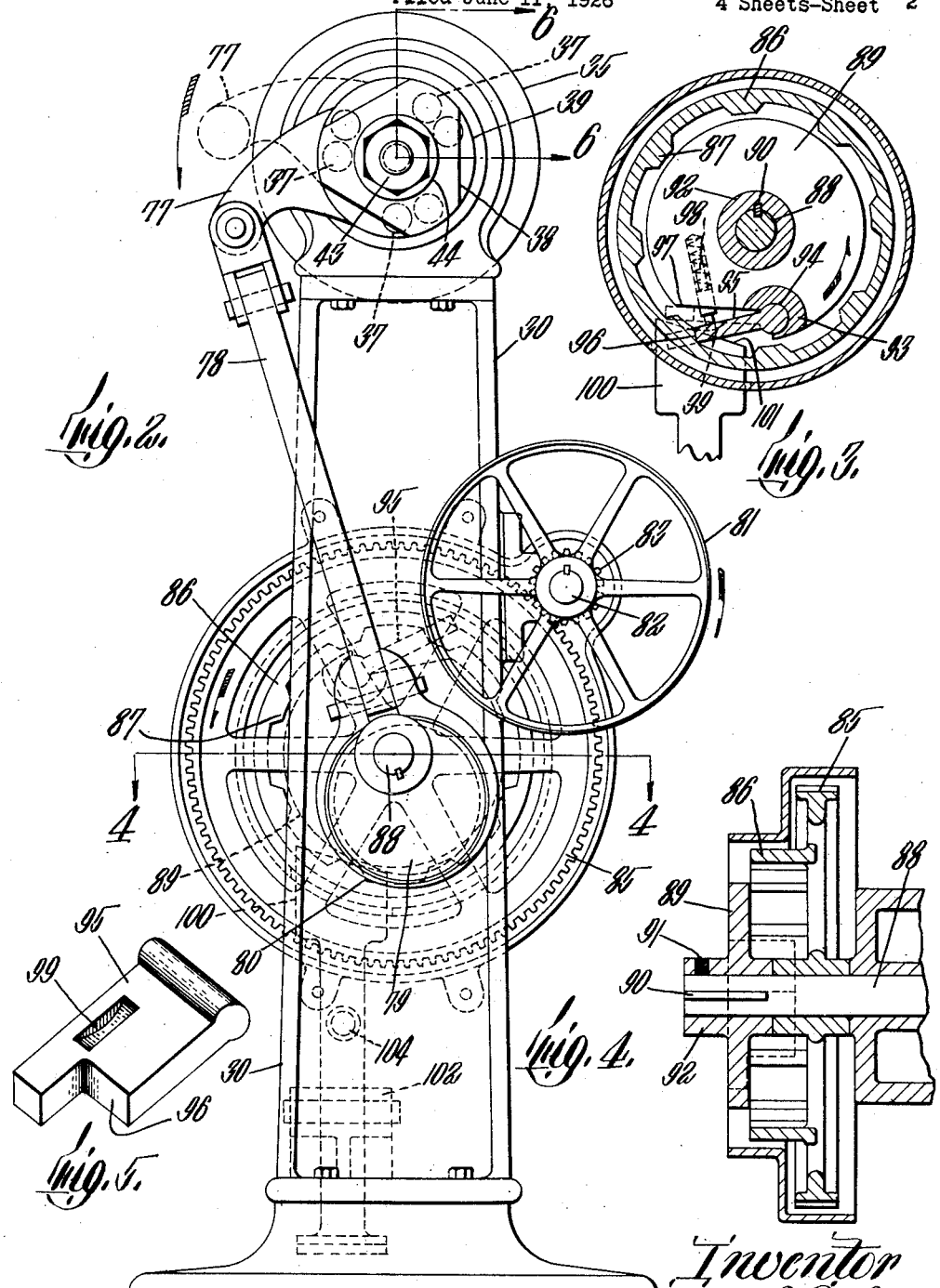

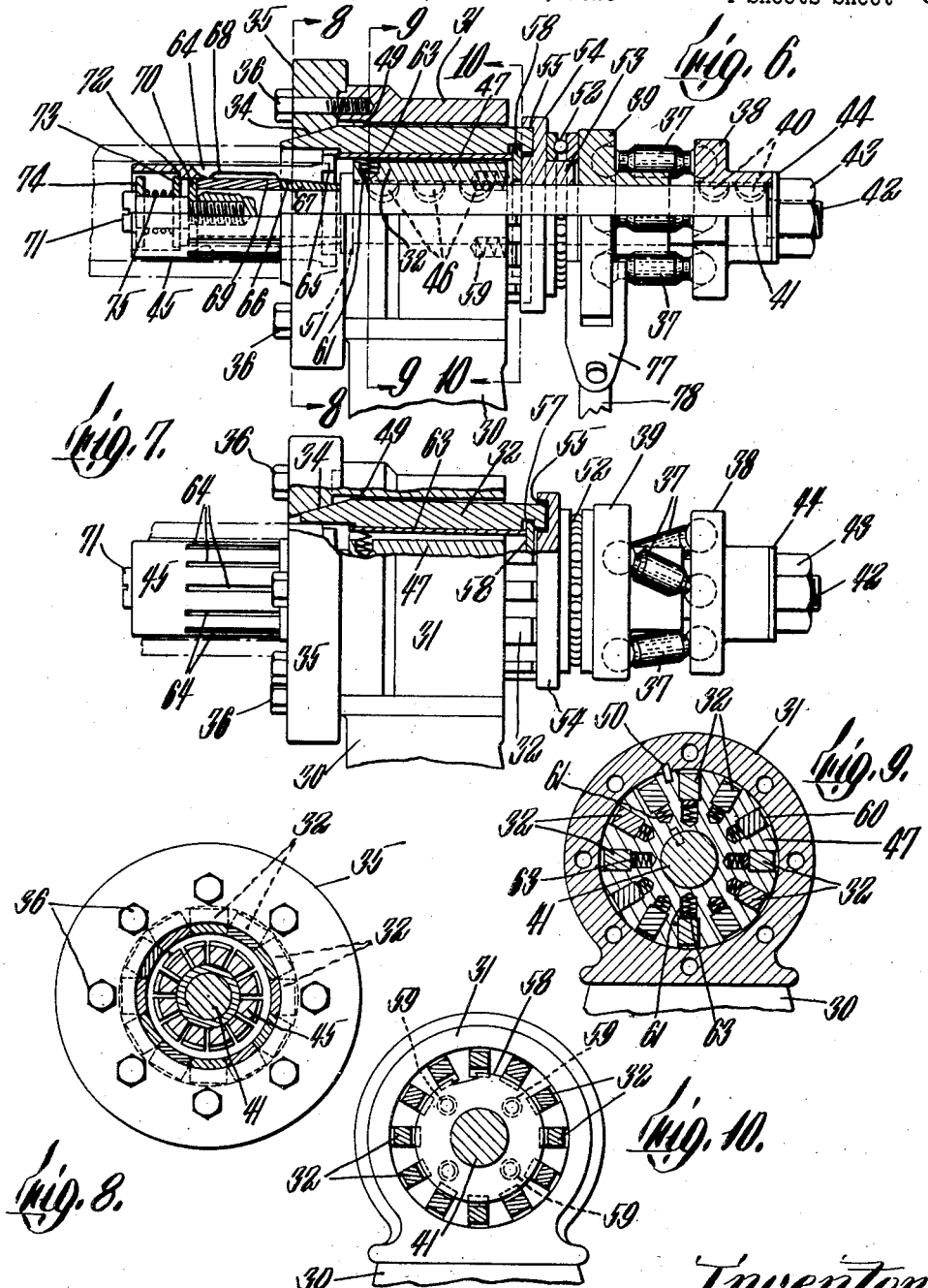

1,673,993

UNITED STATES PATENT OFFICE.

HOWARD PARKER, OF BERLIN, NEW HAMPSHIRE.

METHOD OF AND MACHINE FOR SQUEEZING TUBE ENDS.

Application filed June 11, 1926. Serial No. 115,235.

This invention relates to a method of and machine for reducing the thickness of material of the end portions of tubes which are made of compressible material. An object of the invention is to squeeze and compress the material of the end portions of tubes to predetermined internal and external diameters. The method of this invention applies for example to laminated paper tubing, but also applies to any other material which is capable of being compressed to the desired size. A particular field of usefulness for the method and machine embodying the invention is found in the case of wound paper tubes which are often used as cores for rolls of paper or other sheet material. Such cores are often made of tubes formed of several strips of paper spirally wound one upon another with paste or cement between successive layers. These tubes are cut to the desired lengths and are customarily provided with metal clips or caps of annular shape which are fitted on the ends of the tube to engage the inner and outer walls thereof and to cover the end edges. This protects the cores at their ends, where they are most liable to injury and makes possible the repeated use of the cores in spite of relatively rough handling which would soon tear and mutilate unprotected paper ends. It is usually desirable that such cores have a substantially uniform external diameter from end to end. Hence it is customary to make the clips and tubes with equal external diameters. This necessitates the reduction of the external diameter of the end portions of the tube which receive the caps by an amount equal to the thickness of the material of which the caps are made. Heretofore it has been the practice to effect this reduction of diameter by cutting away in one way or another the material on the outer surface of the end portions of the tubes. In the case of spirally wound tubes, this cutting process generally loosened up the outer layers and rendered them liable to unwind. To obviate this it was necessary to apply a coat of sizing or cement to the outer surface adjacent the cut-away portions to secure the outer layers. Another drawback to the cutting method was that the removal of a part of the material of the tube weakened the end portion.

By my invention I support the inner wall of the end portion of a tube at the standard internal diameter and apply squeezing pressure to the outer surface of the end portion, the squeezing members being adjustable to squeeze and compress the material of the end portion of the tube to the desired external diameter to receive a clip or cap thereon. The squeezing does not injure the material in any way, but on the contrary it actually strengthens the end portions by compacting the layers more firmly together.

Further advantageous features and combinations will be apparent to one skilled in the art from the disclosure of the invention in the following description and on the drawings, of which,—

Figure 1 is a side elevation of the entire machine.

Figure 2 is an end elevation of the same from the rear end, that is, the end away from the operator.

Figure 3 is a section taken on the line 3—3 of Figure 1.

Figure 4 is a section on the line 4—4 of Figure 2.

Figure 5 is a perspective of the pawl shown in Figures 2 and 3.

Figure 6 is a side elevation of the squeezing mechanism, a part being in section taken on the line 6—6 of Figure 2.

Figure 7 shows the same mechanism as in Figure 6, but with the parts in a different position.

Figures 8, 9 and 10 are sections taken respectively on lines 8—8, 9—9 and 10—10 of Figure 6.

Figure 11 is a perspective of one of the squeezing jaws.

Figure 12 is a perspective of the body chuck.

Figure 13 is an end elevation of a portion of the machine showing a lever for hand operation in place of the power connection.

Figure 14 is a fragmentary section of an end of a tube with a clip thereon.

Referring to the drawings in detail, the squeezing mechanism is mounted on a suitable standard 30, a portion thereof being contained in a suitable housing 31. The mechanism consists essentially of a plurality of jaws 32 which are disposed in the form of a cylinder within the housing 31. The operating ends 33 of the jaws 32 are broader than the shank portions and are tapered to form wedges so that when projected forwardly toward the operator, the inclined faces of the wedge portions 33 engage a complementary inclined face 34 which constitutes the inner surface of a ring or reaction member 35 secured to the housing 31 as by lag bolts 36. The inner faces of the wedge portions 33 are cylindrically curved so that when the jaws are assembled in the machine, these faces substantially constitute a cylinder of a size to fit over an end portion of a tube to be squeezed. The jaws 32 are forced radially inward to squeezing and clamping position by relative motion between the jaws and the ring. In the particular machine shown in the drawing, the ring is held fixed while the jaws are moved longitudinally by any mechanism suitable for the purpose, as for example, toggles 37. As shown in Figures 1, 6 and 7, the toggles are elongated studs having ball-shaped ends fitting into suitable sockets formed respectively in a toggle flange 38 which is anchored to the ring 35 and a toggle drive 39 which pushes the jaws 32. Rotation of the toggle drive 39 through a limited arc to bring corresponding ball sockets into alignment will bring the toggles 37 into substantial parallellism with the axis of rotation of the toggle drive and thus force a toggle drive 39 to the left with respect to the flange 38. The toggle flange 38 is fixed against rotation and motion away from the ring 35 (i. e., to the right in Figure 6) by suitable keys 40 and a washer 44 backed by a nut 43 threaded to a reduced end 42 of a mandrel 41 which extends through the apparatus shown in Figure 6 axially with respect to the rotating parts. The mandrel 41 is in turn anchored against rotation or movement to the right as by a flange 51 formed thereon and keys 46, the flange and keys engaging a body chuck 47 which fits closely into the housing 31 and is fixed therein by a flange 48 which is clamped between a complementary shoulder 49 formed in the housing 31 and the ring 35. A key 50 may also be provided to lock the chuck 47 positively against rotation. Thus the toggle flange 38 is fixed against rotation or movement toward the right with respect to the ring 35 by the mandrel 41, the chuck 47, and the housing 31.

The mandrel 41 at its forward end carries a sleeve 45 which supports the work and cooperates with the jaws 32 as will be hereinafter described. The body 47 is shown in perspective in Figure 12 and is cylindrical in shape, with longitudinal slots 60 in its surface to receive the jaws 32. As far as operability is concerned, the chuck 47 and housing 31 could be made in one piece, but the practical difficulties of forming suitable channels for the jaws 32 in such a piece make the built-up structure described more economical to construct. As shown, the slots 60 are cut through the flange 48, making the latter appear as a series of slight projections on the ribs between the slots. As an alternate form, the flange 48 could comprise a ring of suitable cross section, riveted, welded, or otherwise secured to the chuck 47.

Since the toggle flange 38 is anchored against motion to the right, it is apparent that the toggle action of the toggles 37 must result in a forward movement of the jaws 32 relative to the ring 35, and a consequent closing of the jaws by reason of the cam action of the contacting faces of the jaws and ring as the jaws are moved forward. Between the ends of the jaws and the toggle drive 39, a suitable ball bearing race 52 is interposed to minimize the friction between the stationary parts associated with the jaws and chuck and the rotating toggle drive 39. The bearing race 52 is carried by a boss 53 formed on a retaining member 54 which has in its forward face an annular slot 55 to receive the rear ends of the jaws 32 and to hold them in position. The outer surface of these rear ends are rounded as at 56 to fit into the slot 55 of the retainer. On the inner surface of each jaw a transverse slot 57 is cut to receive a locking ring 58. This ring insures simultaneous motion of all jaws in either direction. Suitable springs 59 are inserted in recesses in the rear face of the body chuck 47 and bear against the forward face of the locking ring 58 to move the jaws 32 and their associated moving parts to the right whenever the pressure from the toggle drive 39 is relieved. Each jaw 32 slides in a slot 60 in the body chuck 47 and is normally pushed radially outward therefrom by suitable springs 61 inserted in recesses 62 in the body chuck. As will be seen in Figure 12, four of the slots 60 are cut deeper than the remainder of the slots, these deeper cuts being for fingers 63, the rear ends of which engage the locking ring 58 while the forward ends engage the rear end of sleeve 45 so as to push the sleeve 45 forwardly with the forward motion of the squeezing jaws 32, so that there is no sliding of the work on the jaws or the sleeve during the squeezing operation. The sleeve 45 may be a plain hollow cylinder with an external diameter equal to the internal diameter of the work to be operated on. In order, however, to avoid difficulties due to the work binding on the sleeve after being squeezed, it is preferred to form longitudinal slots 64, the latter extending from the rear end forwardly for the greater portion of its length. At the rear end of the sleeve a flange 65 is provided forming a shoulder against which the end of a tube may abut. The inner surface of the rear portion of the sleeve is preferably inclined as at 66 cooperating with the conical surface of a tapered collar 67 which is carried by the mandrel 41. The mid-portion of the sleeve 45 is preferably hollowed as at 68 to add to the resilience of the rear portion. The outer surface of the rear portion is tapered slightlly so as to be normally less than the internal diameter of the work, but, when expanded by the tapered collar 67, to be equal to the normal internal diameter of the work. Thus when the jaws 32 are moved to the right to clamping or squeezing position, the fingers 63 simultaneously engage the end portion 65 of the mandrel sleeve 45 and push the sleeve to the right by the same amount, so that when the jaws 32 reach their limiting squeezing position, the sleeve 45 is at the same time expanded to the normal inner diameter of the work. By making the split sleeve undersize and providing a collar of greater taper, this construction can be used to enlarge the interior diameters of slightly undersized tubes to standard. When the jaws 32 are retracted rearwardly, the sleeve 45 also moves rearwardly with respect to the tapered collar 67 so that the slotted rear end of the sleeve contracts and permits the work to be readily drawn therefrom. To fix the tapered collar 67 against longitudinal movement on the mandrel 41, it is clamped between the flange 51 of the mandrel 41 and a bushing 69 which is secured in place as by a washer 70 supported by a shoulder on a lag screw 71 threaded into the forward end of the mandrel 41. The inside of the forward end of the sleeve 45 is cut away to form a shoulder 72 on which rests a washer 73. Between the washer 73 and another washer 74 which bears against the head of the lag screw 71 is a compression spring 75. This spring tends to force the sleeve 45 to the right, so that when the toggle pressure is relieved after a squeezing operation and the locking ring 58 moves to the right with the retracting jaws, the spring 75 also pushes the sleeve 45 and the fingers 63 to the right, thus allowing the rear end of the sleeve to contract.

The toggle action may be operated as by a hand lever 76 formed with or secured to the toggle drive 39, its range of motion being limited by suitable stops. For power operation, an arm 77 is preferably made integrally with the toggle drive 39, this arm being pivotally connected to a link 78 which is reciprocated by any suitable mechanism such as a crank or an eccentric. In the present structure, the latter is used, the link 78 being reciprocated by an eccentric 79 working in an eccentric strap 80 to which the link 78 is attached. In order to provide for the operation of the toggle mechanism only at such times as the operator desires, the following mechanism is provided. Power is supplied to the pulley wheel 81 keyed to the shaft 82 on which is also fixed the pinion 83. If desired, an idle pulley 84 may also be provided. The pinion 83 meshes with a gear 85 which carries a circular ratchet member 86 having spaced projecting portions 87 as shown in Figure 3. The gear 85 and the ratchet 86 turn loosely on a shaft 88 on which is fixed a pawl flange 89 as by a key 90 and a set screw 91. The pawl flange 89 has the general form of a disk with a hub member 92 and a projecting portion 93. The latter is provided with a cylindrical recess 94 to receive the cylindrical end portion of a pawl 95 which is shown in Figure 5. The pawl 95 has a generally flat rectangular shape with a portion cut out forming a shoulder 96 adapted to bear against any one of the projections 87 of the ratchet member 86. A portion of the pawl flange 89 is cut away as at 97, the pawl 95 being so arranged that when swung inwardly against the face of the cut away portion 97, the shoulder 96 is out of the path of the continuously moving projections 87. A spring-pressed plunger 98 is provided within pawl flange 89, the end of which engages in a shallow depression 99 in the face of the pawl 95 and presses the pawl outwardly into position to engage any of the projections 87. A trip member 100 is provided (Figures 1 and 3) to engage the pawl 95 on its upper end 101 to hold the pawl out of the path of the projections 87. The trip 100 is pivotally mounted on the trip hanger 102, its lower portion 103 extending outwardly to form an operating treadle. The trip 100 is normally held in position to engage the pawl 95 as by a spring 104. When the operator wishes to operate the toggle mechanism, he steps on the treadle 103 moving the trip outwardly against the tension of the spring 104. This moves the end 101 of the trip from beneath the pawl 95, and the latter is swung radially outward by the spring-pressed plunger 98. The shoulder 96 of the pawl 95 is engaged by one of the projections 87 of the moving ratchet 86, thus carrying the pawl flange 89 around therewith. Since the pawl flange is keyed to the shaft 88 to which the eccentric 79 is also keyed, the latter will rotate once with every revolution of the ratchet 86 and will rock the toggle drive 39, thus bringing into play the toggle motion forcing the jaws 32 into squeezing position. As long as the operator keeps the treadle 103 depressed, the jaws will move to and from squeezing position with each revolution of the gear 85 and ratchet 86. When the treadle 103 is released, the spring 104 pulls the trip 100 back on a line with the pawl 95 so that when the pawl in its rotation with the pawl flange comes against the sloping end 101 of the trip 100, it is swung inwardly as it rides thereon and is thus disengaged from the projections 87. The pawl flange 89 is thus stopped until the treadle is again depressed.

As the jaws are retracted from squeezing position with each revolution of the gear 85, the rearward end portion of the sleeve 45 contracts, permitting the operator to rotate the work on the sleeve so that the jaws engage the surface of the work at different places in their next squeezing action. Thus if narrow ridges are raised on the surface of the work by the first squeeze, due to the slight clearance spaces between successive jaws, by turning the tube slightly after the first squeeze, these ridges may be flattened by the next squeeze so that the whole outer surface of the end portion is made to conform smoothly to the desired external diameter.

This invention thus makes possible the application of metal caps or clips of the same external diameter to the ends of tubes made of paper or equivalent compressible material without sacrificing part of the strength of or wasting material from the end portions. Since the external layers of the tube pass unbroken under the edge of the clip, there is no loose end of paper to peel and unroll from the tube. Hence by my invention a superior core is made by a simple easy operation which requires no skill on the part of the operator and which eliminates waste of material, the finished core being stronger and having better wearing qualities than those heretofore produced.

Having fully described my invention, it should be evident to those skilled in the art that many changes and modifications may be made therein without departing from its spirit or scope as defined by the appended claims.

I claim:

1. The method of making metal-capped fiber cores which comprises squeezing and compressing the end portions of a fiber tube to a smaller external diameter while maintaining the internal diameter substantially unchanged, and sliding a metal cap over each compressed portion.

2. The method of reducing the external diameter of an end portion of a fiber tube, which comprises supporting the interior surface of said portion at substantially its original internal diameter, and applying squeezing pressure to the exterior surface of said portion whereby the material in said portion is compressed and compacted.

3. The method of shaping an end portion of a tube of compressible material, which comprises squeezing and compressing said end portion by simultaneously pressing on the interior and exterior surfaces of said portion, the distance of the pressing movement against the exterior surface being greater than that against the interior surface.

4. The method of capping an end portion of a tube of compressible material, which comprises compressing said end portion to compact the wall thereof to a thickness less than that of the wall of the uncompressed portions of the tube, and placing the cap thereon.

5. The method of shaping an end portion of a tube of compressible material, which comprises pressing the exterior surface of said portion inwardly to reduce the exterior diameter to a predetermined size, and simultaneously supporting the interior surface of said portion at a predetermined diameter throughout substantially all of said pressing operation, whereby the material in said portion is compacted.

6. The method of shaping an end portion of a tube of compressible material, which comprises supporting the interior surface of said portion at a predetermined diameter, alternately applying squeezing pressure on substantially the entire exterior surface of said portion and releasing pressure thereon, and rotating the tube on its axis between successive applications of pressure.

7. The method of metal-tipping an end of a fiber core, which comprises providing an annular cap of sheet metal having an extreme diameter substantially equal to that of the tube, simultaneously maintaining the inner diameter of the tube at substantially its original size and reducing by compression the external diameter of an end portion of the tube by an amount substantially equal to the thickness of the material of which the cap is made, and placing the cap on said end portion.

8. The method of making a metal-tipped fiber core of substantially uniform external diameter from end to end, which comprises forming a fiber tube of uniform diameter, compacting and pressing the walls of the end portions inwardly a predetermined distance, and fitting on said compressed end portions metal caps of material having a thickness equal to said distance of compression and an extreme diameter equal to that of the uncompressed portion of the tube.

9. A machine of the class described comprising means for engaging substantially the entire interior surface of an end portion of a tube of compressible material, means for engaging substantially the entire corresponding exterior surface of said portion, and means for moving one of said engaging means toward the other, whereby an end portion of a tube placed therebetween is compacted and shaped.

10. A machine of the class described comprising means for supporting the end portion of a tube from within, means for engaging substantially the entire exterior surface of said portion, and means for moving said supporting means radially outwardly and at the same time moving the exterior engaging means inwardly whereby the end portion of a tube placed between said means is compacted.

11. A machine of the class described comprising a set of fingers disposed in cylindrical form to engage the interior surface of an end portion of a tube, a set of jaws disposed in cylindrical form to engage the exterior surface of said portion, means for causing the fingers to move radially outward against the interior surface of said portion, and means for moving the jaws inwardly against the exterior surface of said portion.

12. In a machine for compressing end portions of tubes, expanding supporting means engaging the interior surface of an end portion, and contracting means engaging the exterior surface of said portion, the radial motion of said contracting means being greater than the radial motion of said expanding means.

13. A machine of the class described comprising means for engaging substantially the entire inner surface of an end portion of a tube and for pressing said surface to a predetermined diameter, means for engaging substantially the entire outer surface of said portion and for pressing said outer surface inwardly to a predetermined diameter, means actuable to cause said inner and outer engaging means to move outwardly and inwardly respectively from normal position, and means for returning said engaging means to normal position.

14. A machine of the class described comprising means for supporting an end portion of a tube from within, means for compressing said portion to a predetermined exterior diameter, and means for actuating said compressing means to move alternately to compressing and releasing positions.

15. In a machine for compressing end portions of tubes, a fixed ring having its inner surface beveled, a fixed tapered member within the ring and coaxial therewith, an expanding chuck having an internally tapered portion in slidable engagement with said tapered member, a set of jaws having tapered portions in slidable engagement with the beveled surface of the ring, said chuck and set of jaws being positioned to receive the work therebetween, and means for simultaneously causing the chuck and the set of jaws to slide respectively on the tapered member and the ring, whereby the chuck is expanded and the set of jaws contracted.

16. In a machine for compressing end portions of tubes, a set of wedge members to engage the inner surface of the work, another set of wedge members to engage the outer surface of the work, reaction means against which said wedge members are adapted to bear, and means for moving said members simultaneously relative to said reaction means into wedging engagement with the inner and outer surfaces of the work.

17. In a machine for compressing end portions of tubes, a support for the inner surface of the work, a set of movable wedges having side faces engaging the outer surface of the work, reaction means engaging the side faces of the wedges opposite to the work, and actuating means for forcing the wedges into wedging engagement between the work and said reaction means, said actuating means including a toggle connection.

18. In a machine for compressing end portions of tubes, a support for the inner surface of the work, a set of movable wedges having side faces to engage the outer surface of the work, reaction means engaging the side faces of the wedges opposite to the work, actuating means for moving the wedges into and out of wedging engagement between the work and said reaction means, said actuating means including a toggle connection, a link reciprocable to actuate the toggle connection, and means for reciprocating the link.

19. In a machine for compressing end portions of tubes, a support for the inner surface of the work, a set of movable wedges to engage the outer surface of the work, means for forcing the wedges laterally against said outer surface comprising a ring to take the reactive thrust of the wedges and a toggle connection actuable to move the wedges, and means for actuating the toggle comprising a reciprocable link connected thereto, driving mechanism for reciprocating said link including a pawl, a continuously rotating circular ratchet, and a tripping device normally holding the pawl out of engagement with said ratchet, said device being actuable to permit engagement of the pawl with the ratchet whereby the link member is reciprocated and the toggle and wedges are actuated.

In testimony whereof I have affixed my signature.

HOWARD PARKER.

CERTIFICATE OF CORRECTION.

Patent No. 1,673,993.                                       Granted June 19, 1928, to

HOWARD PARKER.

It is hereby certified that the above numbered patent was erroneously issued to the inventor said "Parker", whereas said patent should have been issued to "Brown Company", of Berlin, N. H., a Corporation of Maine, as assignee of the entire interest in said invention, as shown by the records of assignments in this office; and that the said Letters Patent should be read with this correction therein that the same may conform to the record of the case in the Patent Office.

Signed and sealed this 31st day of July, A. D. 1928.

(Seal)

M. J. Moore,
Acting Commissioner of Patents.